(12) United States Patent
Katz

(10) Patent No.: US 7,045,805 B2
(45) Date of Patent: May 16, 2006

(54) APPARATUS AND METHOD FOR SUPPORTING AND SHAPING A PHOTO-STIMULABLE PHOSPHOR PLATE

(76) Inventor: Noa Katz, 52 Nurthumberland Rd., New Darnet, Hertfordshire EN5 1EE (GB)

( * ) Notice: Subject to any disclaimer, the term of this patent is extended or adjusted under 35 U.S.C. 154(b) by 319 days.

(21) Appl. No.: 10/636,697

(22) Filed: Aug. 8, 2003

(65) Prior Publication Data

US 2005/0029475 A1 Feb. 10, 2005

(51) Int. Cl.
B65H 5/00 (2006.01)
B65H 7/00 (2006.01)
(52) U.S. Cl. .................. 250/589; 250/580
(58) Field of Classification Search ........... 250/589, 250/580
See application file for complete search history.

(56) References Cited

U.S. PATENT DOCUMENTS

| 4,485,302 | A | * | 11/1984 | Tanaka et al. | 250/585 |
| 4,945,238 | A | * | 7/1990 | Muraishi | 250/589 |
| 5,025,157 | A | * | 6/1991 | Katsuaki | 250/589 |
| 5,859,441 | A | * | 1/1999 | Muraishi | 250/584 |
| 2004/0113107 | A1 | * | 6/2004 | Sakabe | 250/582 |

* cited by examiner

Primary Examiner—Otilia Gabor
Assistant Examiner—Christine Sung
(74) Attorney, Agent, or Firm—Dennison, Schultz, Dougherty & MacDonald

(57) ABSTRACT

Apparatus and method for supporting and shaping a photo-stimulable phosphor plate (PSP) during scanning in a CR reader, the apparatus including elements for shaping at least part of a PSP to an arc which is a part cylinder, and which provides a substantially unitary radial distance from a beam deflecting device to a target point of scanning.

17 Claims, 10 Drawing Sheets

APPARATUS AND METHOD FOR SUPPORTING AND SHAPING A PHOTO-STIMULABLE PHOSPHOR PLATE

FIELD OF THE INVENTION

The present invention relates to Computed Radiography (CR), in general, and, in particular, to apparatus for supporting and shaping a photo-stimulable plate in a CR reader for computed radiography systems.

BACKGROUND OF THE INVENTION

Computed Radiography (CR) is a process for capturing digital radiographic images. CR technology has been around since the early 1980s and has been widely accepted as a digital image acquisition process that produces images equivalent to conventional x-ray film-screen systems. For exposure, a storage phosphor plate (a photo-stimulable plate, or PSP) is placed in an x-ray cassette, instead of an X-ray film sheet. The storage phosphor plate fits inside a standard film cassette and is exposed to x-rays exactly like film.

Storage phosphor plates look like the intensifying screens found in conventional film-screen cassettes. However, instead of emitting light immediately when exposed to x-rays, they have the special property of storing the x-ray energy in a latent image. This latent image is "developed" in a CR reader, when the phosphor plate is scanned by a light beam, such as a laser beam. For example, the plate can be inserted into a CDCR 5020s, where it is scanned with a high power diode laser. The laser beam causes the storage phosphors to release UV light energy they have captured, in a photo-stimulable process. The CR reader extracts the information stored in the plate and this energy is converted into a digital image.

CR virtually eliminates the need for re-takes, eliminates lost images, simplifies the filing of images, and increases the capability for consultation made possible by electronic transmission of digital images. Storage phosphors also are unique because they respond to a very wide dynamic range of x-ray exposures. This latitude gives you flexibility in selecting x-ray technique without worrying about under or over exposure. Regardless of the exposure, the image can be displayed in an optimal fashion. As a consequence, retakes due to inappropriate exposures are drastically reduced.

After exposure and scanning, the phosphor plate is "erased" by exposing it to bright light. The residue of the previous latent image in the phosphors is removed, and the plate is ready to be exposed again. The life of a phosphor plate depends on how carefully it is handled. Physical damage to the plate will limit its useful life. There is nothing about the chemistry of the phosphors that degrades after repeated exposures. If properly cared for, a plate will produce thousands of images. In factory tests, a single plate has been scanned more than 10,000 times and was still in excellent condition. However, in conventional CR readers, the PSP is removed from the cassette before being inserted into the reader. In readers with rollers, the roller grabs the plate and can bend or rub the material, leading to reduced lifetime and image quality. Accordingly, two types of plates are currently in use—a substantially stiff plate which is difficult to bend, and a flexible plate which can be bent onto a cylinder for reading.

Traditional CR readers for mass production, as shown for example, in U.S. Pat. No. 4,778,995 to Kulpinksi et al. and U.S. Pat. No. 5,151,597 to Agano, include a flat support for the phosphor plate. The phosphor plate is held in the flat support while the optics in the CR reader scan the plate. However, this arrangement requires a complex system of optics in order to scan the phosphor plate, since the stimulating laser beam must be perpendicular to the plate when it is scanned. At present, this is accomplished by means of an $F\theta$ lens, which is very expensive.

Accordingly, it has been suggested to utilize a curved support for the phosphor plate. For example, in U.S. Pat. No. 4,525,749 to Maeda et al. and U.S. Pat. No. 4,816,923 to Saotome, there are shown radiation image information read-out devices having a sheet fixedly supported on the concave surface of a semi-cylindrical support during scanning by a light beam.

Cylindrical holders for photosensitive material are shown in U.S. Pat. No. 4,595,957 to Holthusen, and U.S. Pat. No. 6,207,968 and 6,291,831 to Koren, the latter providing scanning optics such that the light beam is at all times perpendicular to the medium at the point of impact of the beam with the medium. This system suffers from the disadvantage that the radius must be small, on the order of 90 mm, in order to achieve a compact device with a short laser path.

Accordingly, there is a long felt need for an inexpensive CR reading device providing a scanning beam perpendicular to the medium, and it would be very desirable to have such a device which doesn't damage photostimulable plates during the process of insertion and positioning.

SUMMARY OF THE INVENTION

A primary object of the present invention is to provide an apparatus for loading and shaping a PSP (photostimulable phosphor plate) to a precise curved surface during scanning in a CR reader by a simple mechanism.

A second object of the present invention is to provide an apparatus that shapes the PSP in a way that compensates for all geometry changes which occur in the total path of the laser beam from the last lens to the target (the PSP), in order to keep the focal distance of the laser accurate and constant.

There is thus provided, in accordance with the present invention, apparatus for supporting and shaping a photostimulable phosphor plate (PSP) during scanning, the apparatus including an element for shaping at least part of a PSP to an arc which is a part cylinder, and which provides a substantially unitary radial distance from a beam deflecting device to a target point of scanning. The shaping elements may be disposed in a PSP cassette, in a scanning compartment of a CR reader, adjacent an endless belt on which the PSP can be mounted, and so on.

According to one embodiment of the invention, the apparatus for supporting includes a cassette for a photo-stimulable plate (PSP) for use in a CR reader, the cassette including a base adapted to receive a PSP, and the shaping element includes a lifting mechanism disposed in the base, the lifting mechanism being arranged to permit the plate to lie flat on the base when outside the CR reader, and to lift the sides of the plate during scanning inside the CR reader.

According to one embodiment of the invention, two lifting mechanisms are mounted along opposing sides of the base, each lifting mechanism including at least one lifting element pivotally mounted on a rod, the rod being actuated as the base is inserted into and ejected from the CR reader.

According to an alternative embodiment of the invention, the shaping element includes a plurality of plates, each having a curved PSP-supporting surface, the plates being pivotally mounted in the cassette. When in a folded orientation (when the cassette is outside of the CR reader), the plates lie parallel to the base of the cassette, and the PSP is held in the cassette in a flat orientation. As the cassette is inserted into the CR reader, the plates pivot until they are perpendicular to the base of the cassette, and hold the PSP in a fully shaped orientation (approximating a part-cylinder) for scanning.

According to another embodiment of the invention, the cassette is associated in the CR reader with a light guide for collecting UV light from a PSP in the cassette, the light guide including a curved surface of the same curvature as the PSP during scanning.

According to another embodiment of the invention, the shaping element is mounted in a scanning compartment in a CR reader.

According to a further embodiment, the shaping element includes a plurality of raised guide elements mounted adjacent an endless belt on which the PSP is mounted.

There is also provided, in accordance with the present invention, a method for supporting and shaping a photo-stimulable plate (PSP) in a CR reader during scanning, the method including associating with the PSP an element for temporarily shaping at least part of a PSP to an arc which is a part cylinder, and which provides a substantially unitary radial distance from a beam deflecting device to a target point of scanning. The shaping elements may be disposed in a PSP cassette, in a scanning compartment of a CR reader, adjacent an endless belt on which the PSP can be mounted, and so on.

According to one embodiment, the method includes mounting a PSP in a cassette including a base adapted to receive a PSP, and a shaping element disposed in the base; causing the shaping element to permit the plate to lie flat on the base when the cassette is outside a CR reader, and causing the shaping element to lift the sides of the PSP to approximately a part-cylindrical shape, as the cassette is inserted into the CR reader.

According to another embodiment, the method includes mounting a shaping element in a scanning compartment of a CR reader, causing the shaping element to permit the PSP to lie flat in the compartment when the PSP is being scanned, and causing the shaping element to lift the sides of the PSP to approximately a part-cylindrical shape, as the PSP is scanned in the CR reader.

According to a further embodiment, the method includes mounting a plurality of shaping elements adjacent an endless belt moving through a scanning zone in a an integrated CR radiation image recorder and reader.

BRIEF DESCRIPTION OF THE DRAWINGS

The present invention will be further understood and appreciated from the following detailed description taken in conjunction with the drawings, in which.

DESCRIPTION OF THE PREFERRED EMBODIMENTS

The present invention relates to apparatus and method for supporting and shaping a photo-stimulable phosphor plate (PSP) during scanning, wherein at least part of a PSP is shaped to an arc which is a part cylinder, and which provides a substantially unitary radial distance from a beam deflecting device to a target point of scanning. The shaping elements may be disposed in a PSP cassette, in a scanning compartment of a CR reader, adjacent an endless belt on which the PSP can be mounted, and so on.

There is also provided a cassette for a photostimulable plate (PSP) for use in a CR reader and possibly in a CR recorder. The cassette includes a base adapted to receive a PSP, and a lifting mechanism associated with two opposing sides of the base, the lifting mechanism being arranged to permit the plate to lie flat on the base when outside the CR reader, and to lift the sides of the plate to the desired shape during scanning inside the CR reader. According to one embodiment of the invention, the lifting mechanism is disposed in the CR reader and is actuated by insertion of the cassette. According to an alternative embodiment, the lifting mechanism is disposed inside the cassette. For purposes of the invention, the PSP can be a flexible PSP, a partially flexible PSP, and up to a semi-stiff PSP, any plate which is capable of being shaped mechanically. According to one embodiment of the invention, the cassette is associated with a light guide having a curved surface for collecting UV light from the PSP in the reader during scanning.

Figure 1:
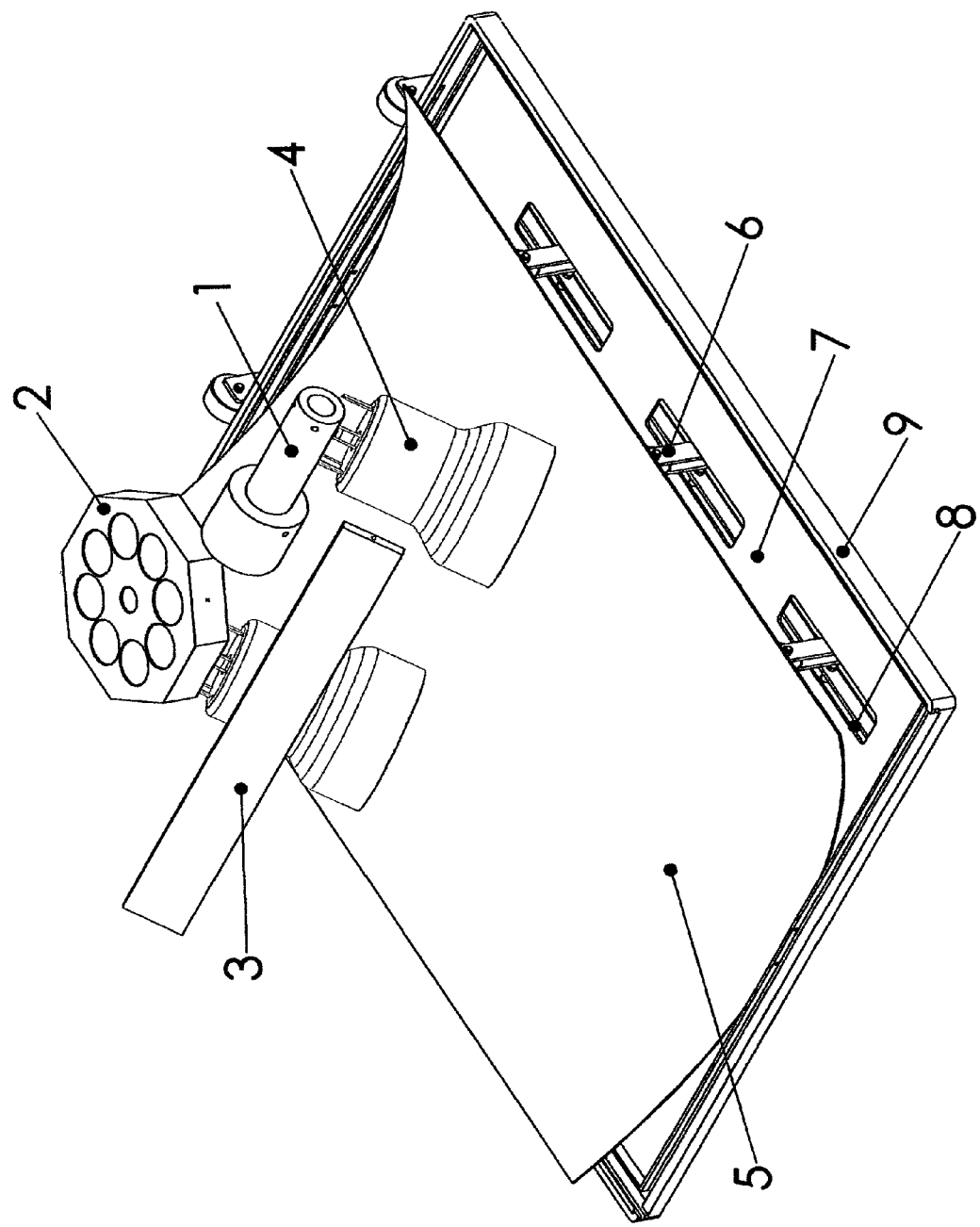
FIG. 1 is a schematic perspective view of a CR reader, including a PSP cassette constructed and operative in accordance with one embodiment of the present invention, in a scanning mode.

With reference to FIG. 1, there is shown a schematic perspective view of a CR reader, including a PSP cassette 7 constructed and operative in accordance with one embodiment of the present invention, in a scanning mode. The CR reader in this embodiment includes a conventional scanning optical system including a stimulating ray source 1, a rotating polygon mirror 2, a fixed folding mirror 3, and a plurality of photomultipliers 4.

A stimulable phosphor sheet (PSP) 5 is held in cassette 7, as shown in FIG. 1, beneath the scanning optical system, so that a latent image stored in the PSP 5 can be read out by the scanning optical system. A stimulating laser beam produced by a stimulating beam source 1 is reflected by mirrors 3 and 2, when the PSP 5 is stimulated by the stimulating laser beam, as known. A spindle motor continuously rotates the polygon mirror 2, which also serves as a beam deflecting device, in the direction indicated by the arrow A to permit deflection of the laser beam to scan the target PSP. The mirror 3 is provided with a reflection surface inclined at an angle of about 45 degrees with respect to the incident stimulating rays. A lens system is associated with stimulating beam source 1 for converging the stimulating laser beam incident as a collimated light to a spot having a desired diameter on the PSP 5. An optical bridge (not shown) holds the scanning optical system, and is moved at a predetermined speed in a sub-scanning direction, all as known. Thus, the PSP 5 is scanned in two dimensions by the stimulating beam.

As the PSP 5 is exposed to the stimulating beam, the exposed portion of PSP 5 emits light in an amount proportional to the radiation energy stored on that portion. The light emitted by the exposed portion of PSP 5 impinges upon a photomultiplier 4 provided as a photo-detector in the optical path. The photomultiplier 4 photo-electrically detects the emitted light and generates electric read-out signals. The read-out signals are processed by an image processing circuit (not shown).

According to the invention, the stimulable phosphor sheet (PSP) 5, carrying a latent radiation image stored thereon, is held in a cassette 7. Cassette 7 includes a base 9 adapted to receive PSP 5, which cooperates with a lifting mechanism 6 disposed in the CR reader. In the embodiment illustrated in FIG. 1, the lifting mechanism is mounted in register with two opposing sides of the base 9 of the cassette. According to this embodiment, each lifting mechanism 6 includes at least one lifting element pivotally mounted on a rod (not shown), the rod being actuated as the base is inserted into and ejected from a scanning compartment in the CR reader. In this way, the lifting mechanism permits the PSP 5 to lie flat on the base when outside the CR reader, and lifts the sides of the PSP to shape it to the desired curve during scanning inside the CR reader. The optimal shape of the PSP is derived from the cumulative focal distance of the stimulating beam, and approximates a part-cylinder, having a pre-selected close-to uniform radius. Preferably, PSP is shaped to an arc which provides a substantially unitary radial distance from the beam deflecting device (here, the polygon mirror) to a target point of scanning on the PSP. In this way, scanning can be carried out using simple optics, yet the stimulating laser beam remains perpendicular to the scanned surface of the PSP at all points throughout the scanning process. Once the image read-out is completed, the cassette is ejected from the CR reader, which causes the lifting mechanism to lie flat inside the cassette, so that the PSP will lay on the cassette base ready for ejecting the cassette from the system.

It will be appreciated that the lifting mechanism can be any type of lifting mechanism which provides shaping of flexible to semi-rigid PSP's to the desired shape for scanning, including a mechanical, electronic or any other mechanism. As illustrated in this embodiment, the lifting mechanism is disposed in the CR reader and permits utilization of standard sized cassettes. According to alternative embodiments of the invention, the lifting mechanism is disposed inside the cassette itself, in which case the cassette will be deeper than a conventional cassette.

Figure 2:
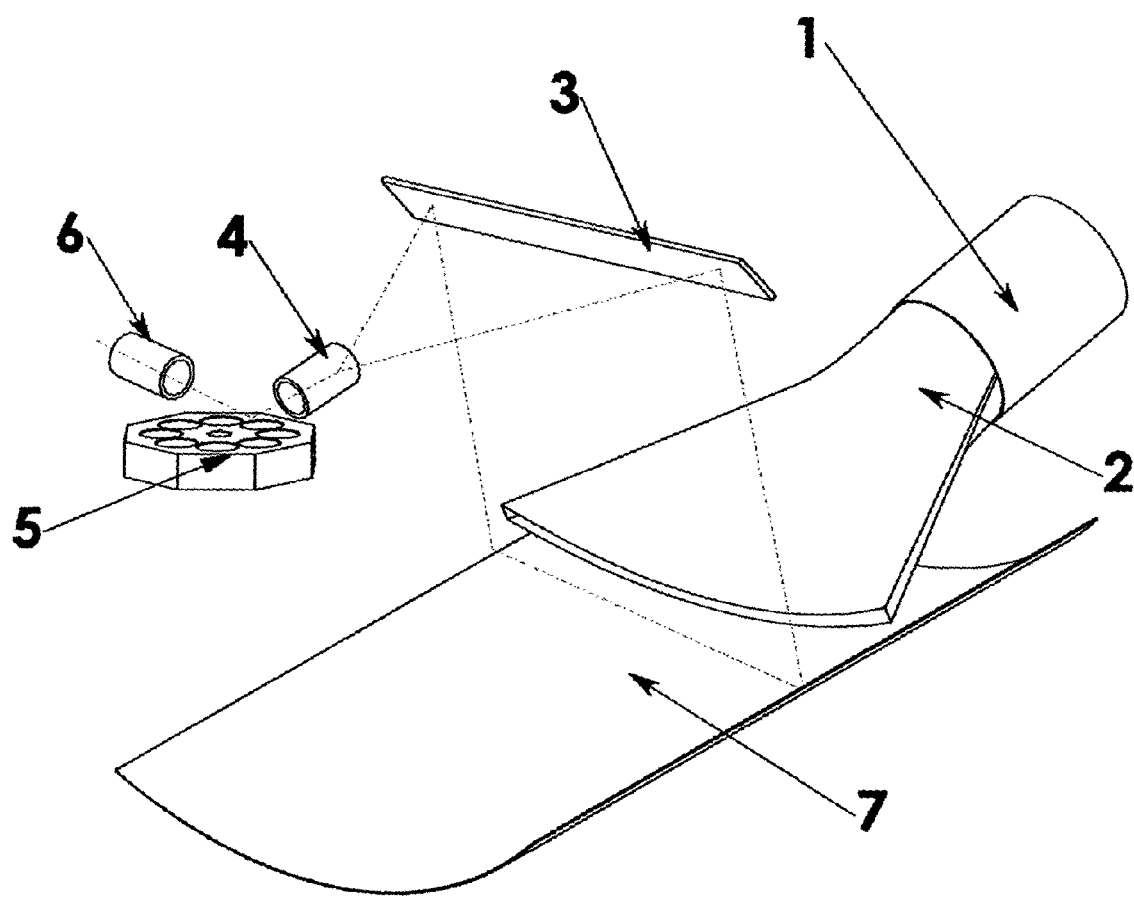
FIG. 2 is a schematic perspective view of a CR reader according to another embodiment of the invention, showing light collection from a shaped PSP using a curved light guide.

FIG. 2 is a schematic perspective view of a CR reader according to another embodiment of the invention. A PSP 17 is shown in a shaped orientation for scanning. In this embodiment, the scanning optical system includes a single photomultiplier 11 and an optical light guide 12 including a curved light collection surface 18, having the same curvature as the shaped PSP during scanning. Utilization of a curved or shaped light collection surface increases the efficiency of collection, as the light guide is equidistant from the surface of the PSP throughout scanning. In addition, a curved light guide obviates the prior art need for a light guide including a very expensive F-theta lens.

Figure 3:
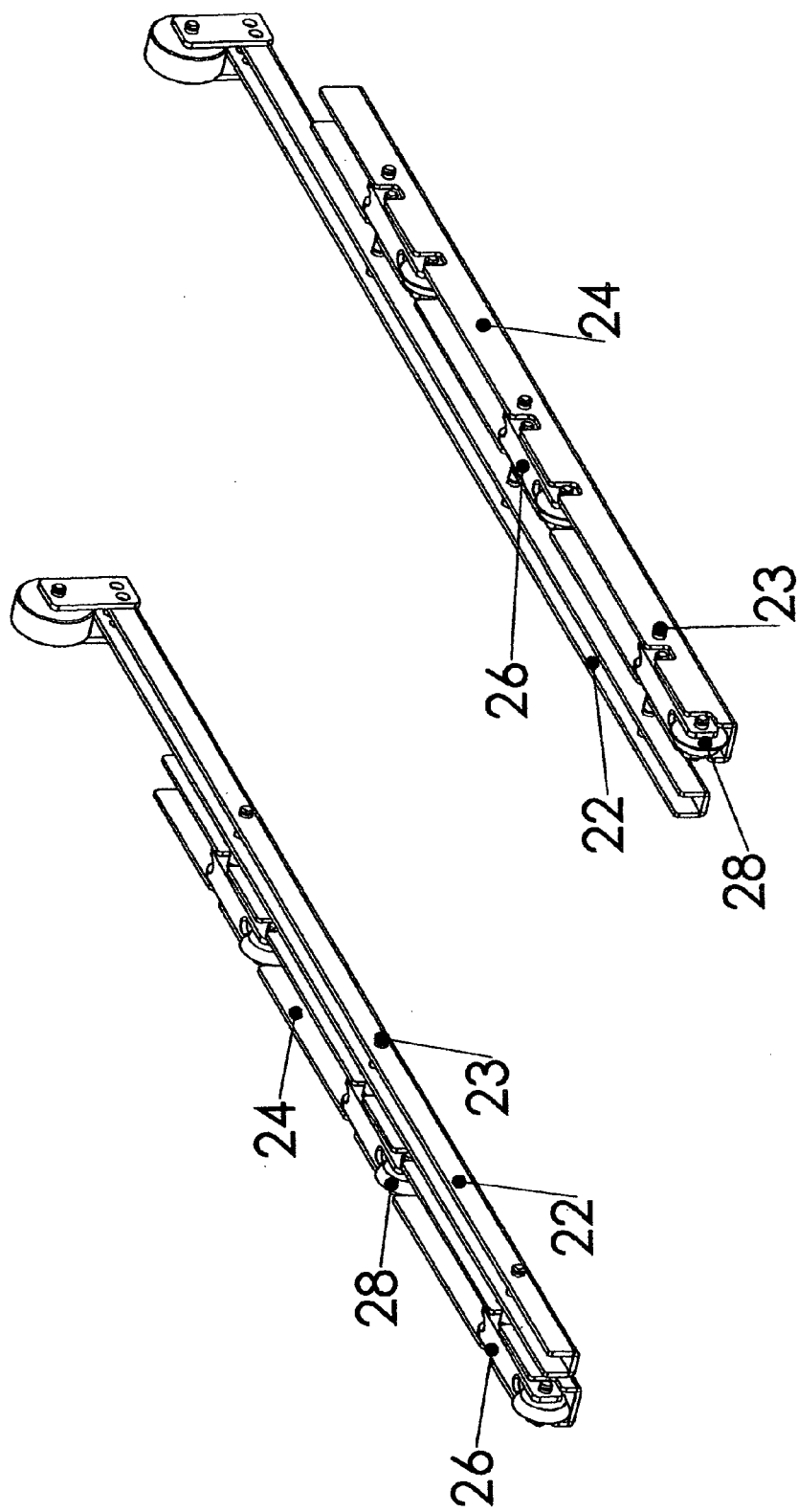
FIG. 3 is a schematic perspective illustration of a pair of lifting mechanisms for use in the PSP cassette of one embodiment of the present invention.

FIG. 3 is a schematic perspective illustration of a pair of lifting mechanisms 20 for use in association with the PSP cassette of one embodiment of the present invention. Each lifting mechanism 20 includes a mounting element 24 affixed to the scanning compartment of a CR reader (not shown), and pivotally coupled, as by pins 23, to a movable rod 22 having a stopper wheel 25 mounted at the end thereof. Movable rod 22 is preferably coupled to the scanning compartment by means of a mounting spring (not shown).

Pivotally coupled to mounting element 24, also about pins 23, is at least one lifting element 26, here illustrated as ending in rollers 28. Lifting elements 26 are disposed in registration with slots in the PSP cassette, and rollers 28 are designed to engage the back side of the PSP to elevate the side edges.

Figure 4:
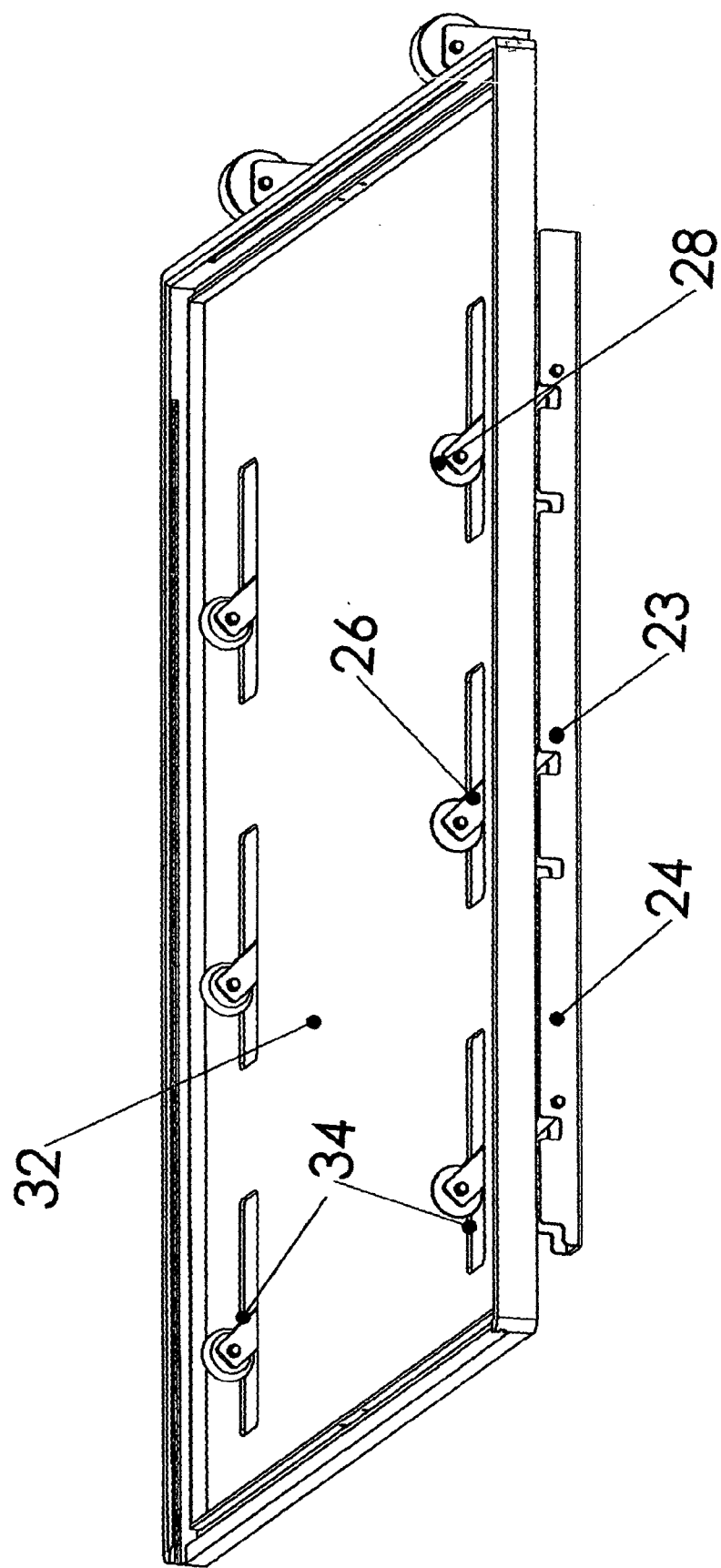
FIG. 4 is a perspective view of a PSP cassette constructed and operative in accordance with a preferred embodiment of the invention in a partially shaped orientation.

FIG. 4 is a perspective view of a PSP cassette 30 according to the invention and including a pair of lifting mechanisms 20, as shown in FIG. 3, in a partially raised orientation. Lifting mechanisms 20 are affixed in the CR reader (not shown) in the scanning compartment where the cassette is inserted. As can be seen, the base 32 of cassette 30 defines a plurality of slots 34, one in register with each lifting element 26. As the cassette is inserted into the CR reader, the cassette pushes against the stopper wheels 25 of movable rods 22, causing the movable rods to move relative to mounting elements 24, against the action of the mounting spring. This, in turn, causes lifting elements 26 to pivot about pins 23 and extend upwardly through the grooves 34 in the cassette, engaging the back surface of a PSP mounted in the cassette.

Figure 5:
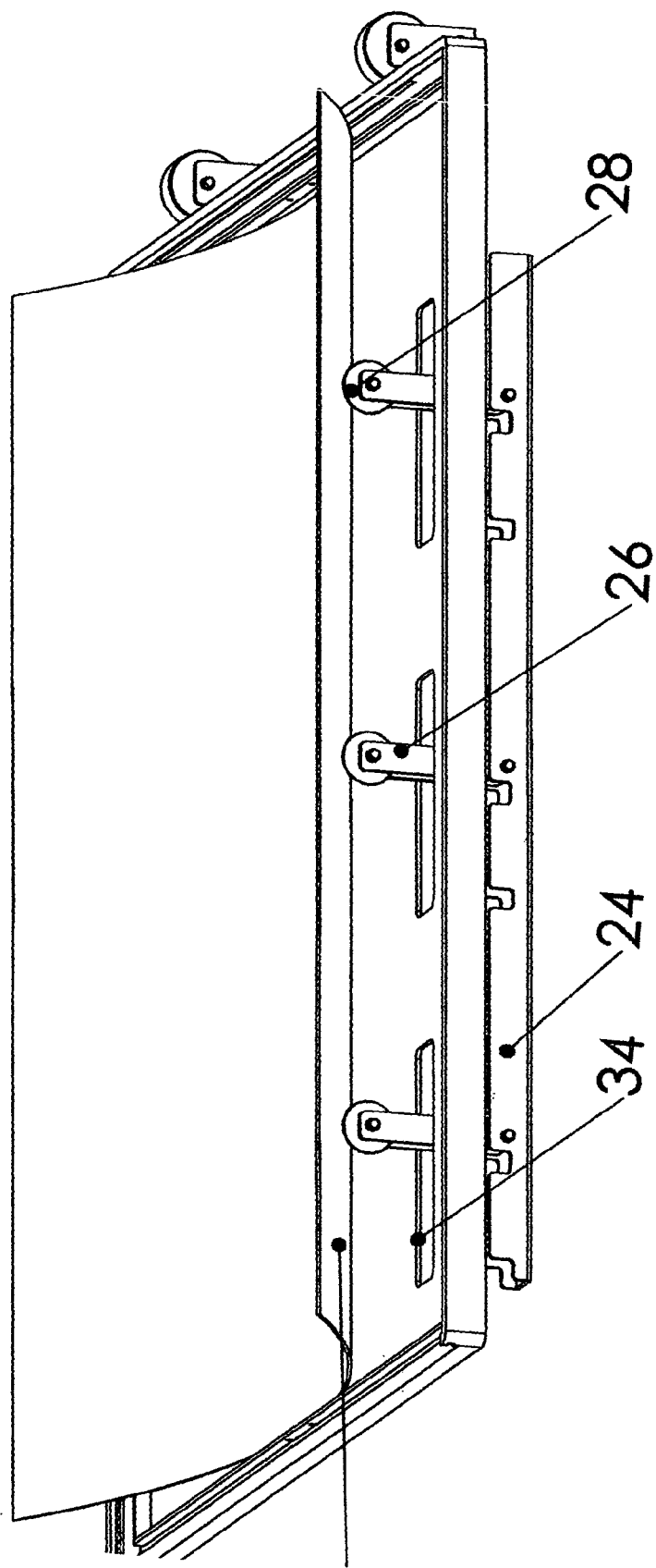
FIG. 5 is a schematic illustration of the PSP cassette of FIG. 4 with a PSP thereon, in a fully shaped orientation.

Lifting elements 26 continue to pivot, until the cassette is completely inside the CR reader, and the lifting elements are substantially perpendicular to base 32, as shown in FIG. 5. A locking pin may be provided to hold the cassette in place in the scanning compartment. In this orientation, the PSP 36 is fully shaped to the desired shape, preferably approximating a part-cylinder. Scanning is now performed inside the CR reader. As the cassette is ejected from the CR reader, movable rod 22 is pulled back to its original position by means of the mounting spring, causing the lifting elements 26 to pivot about pins 23 and he flat beneath grooves 34.

Figure 6:
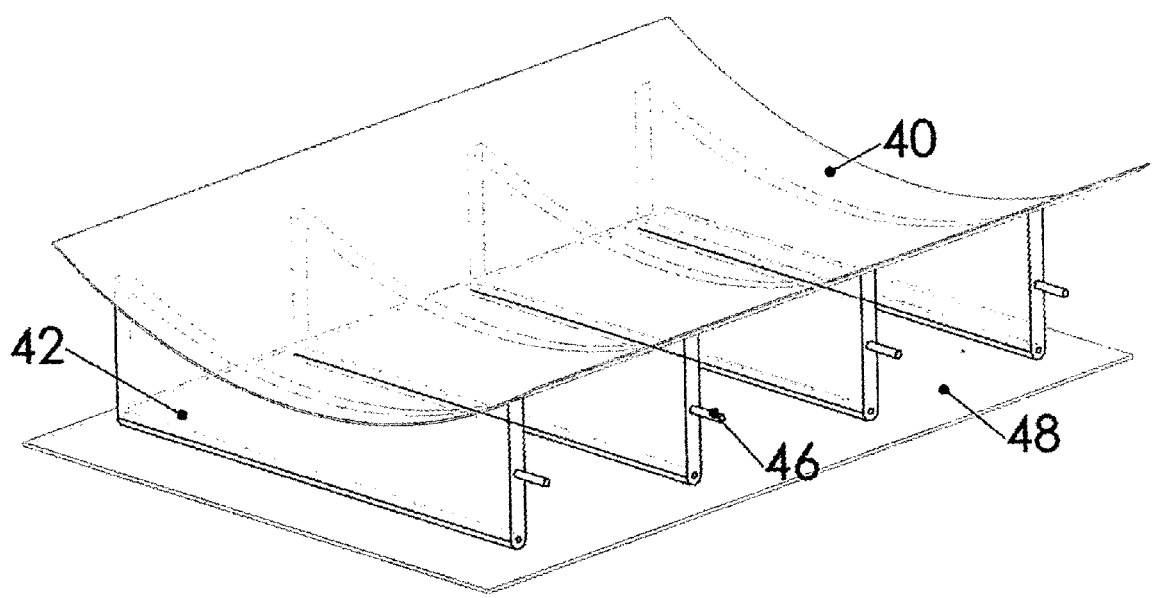
FIG. 6 is a perspective view of a PSP cassette constructed and operative in accordance with another embodiment of the invention with a PSP in a fully shaped orientation.

FIG. 6 is a perspective view of a PSP cassette 40 constructed and operative in accordance with another embodiment of the invention. In this embodiment, the lifting elements are not finger-shaped elements extending through elongate grooves, but rather a plurality of flaps 42 having a curved PSP-supporting surface 44. Flaps 42 are mounted in the cassette as by means of pins 46, which serve as axes of rotation. It will be appreciated that this embodiment of the invention requires a non-standard cassette, which is thicker than a standard-use cassette. When in a folded orientation, when the cassette is outside of the CR reader, flaps 42 lie parallel to the base 48 of the cassette 40, and the PSP 50 is held in the cassette in a flat orientation. As the cassette is inserted into the CR reader, the flaps 42 pivot about pins 46, until flaps 42 are perpendicular to the base of the cassette, and hold the PSP 50 in the fully shaped orientation for scanning, as seen in FIG. 6. Alternatively, flaps 42 can be pivotally mounted in the scanning compartment of the CR reader, in which case, PSP 50 will be removed from the cassette and introduced into the compartment for reading.

It is a particular feature of the present invention that a relatively simple and inexpensive optical scanning system, or an inexpensive conventional CR reader, can be utilized to scan perpendicular to a PSP plate (without the need for an expensive Fθ lens), so as to provide high quality image production at relatively low cost. At the same time, the PSP need not be folded so as to fit into a cylinder of relatively small radius, as in the prior art, but can be shaped to approximate a cylinder of larger radius for ease and accuracy of scanning, without causing damage to the PSP.

While the invention has been illustrated herein as providing symmetrical shaping, it will be appreciated that, alternatively, one side of the PSP can be fixed, while the opposing side of the PSP is lifted over the first side to the desired shape for reading.

Figure 7:
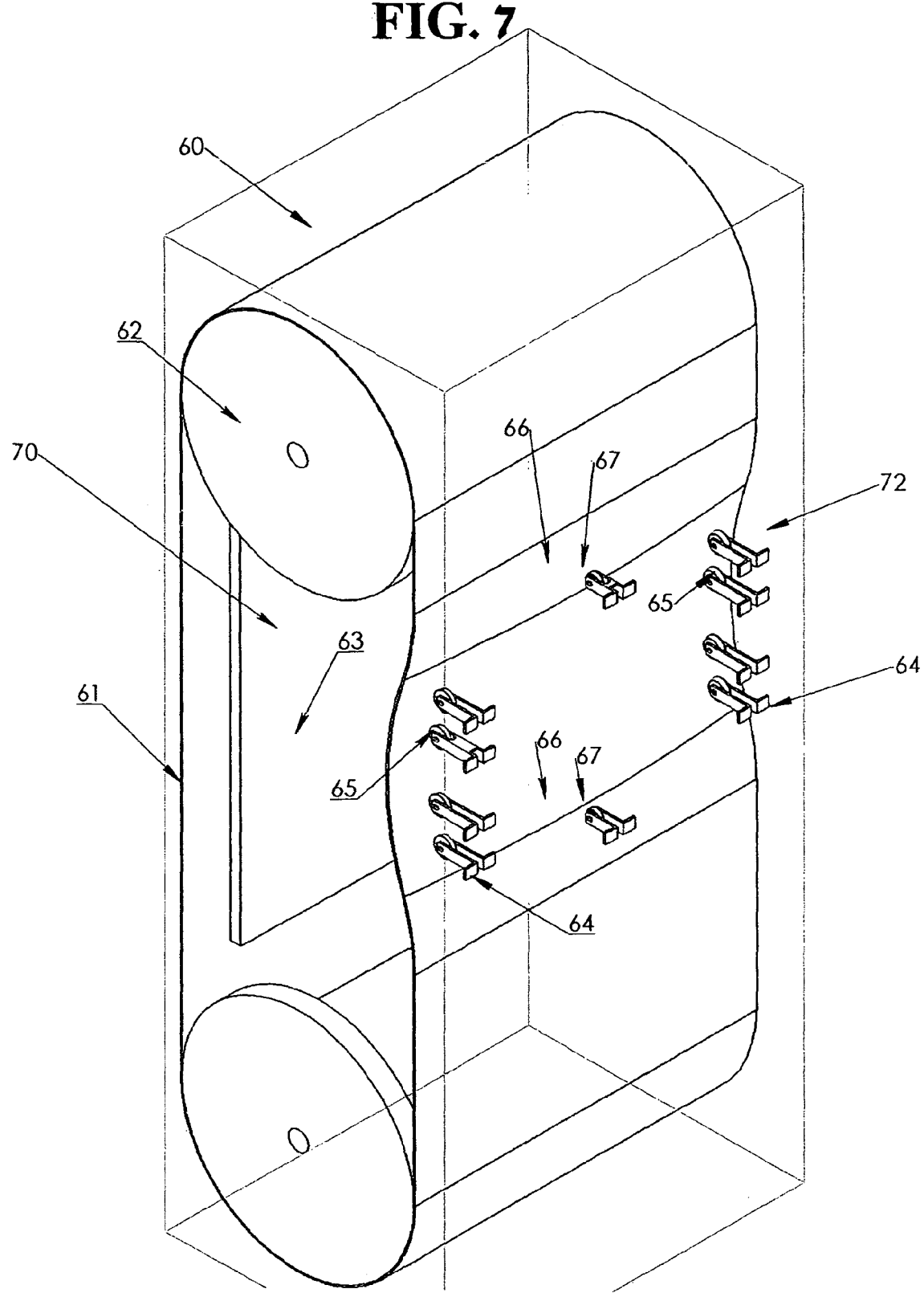
FIG. 7 is a transparent schematic perspective view of an integrated CR radiation image recorder and reader constructed and operative in accordance with an alternative embodiment of the present invention, during exposure.

Further according to the invention there is provided an integrated CR radiation image recorder and a CR reader. Referring now to FIG. 7, there is shown a transparent schematic perspective view of a CR recorder and reader 60 constructed and operative in accordance with an alternative embodiment of the present invention. CR recorder and reader 60 includes an endless belt 61 mounted about a pair of pulleys 62. At least one of pulleys 62 is drivingly coupled to a suitable motor (not shown) for rotation of the pulleys and concomitant movement of the belt 61 through the CR recorder and reader.

A PSP 63 to be irradiated by x-rays and then read is mounted on endless belt 61 is any suitable fashion, such as vacuum or releasable adhesive. As PSP 63 moves past a radiation image recording station 70, (which may be opposite a suitable window in a housing, neither of which is shown), the PSP is irradiated and a latent image stored therein. As can be seen from FIG. 7, radiation image recording station 70 is substantially flat, permitting irradiation utilizing optical systems described above.

Figure 8:
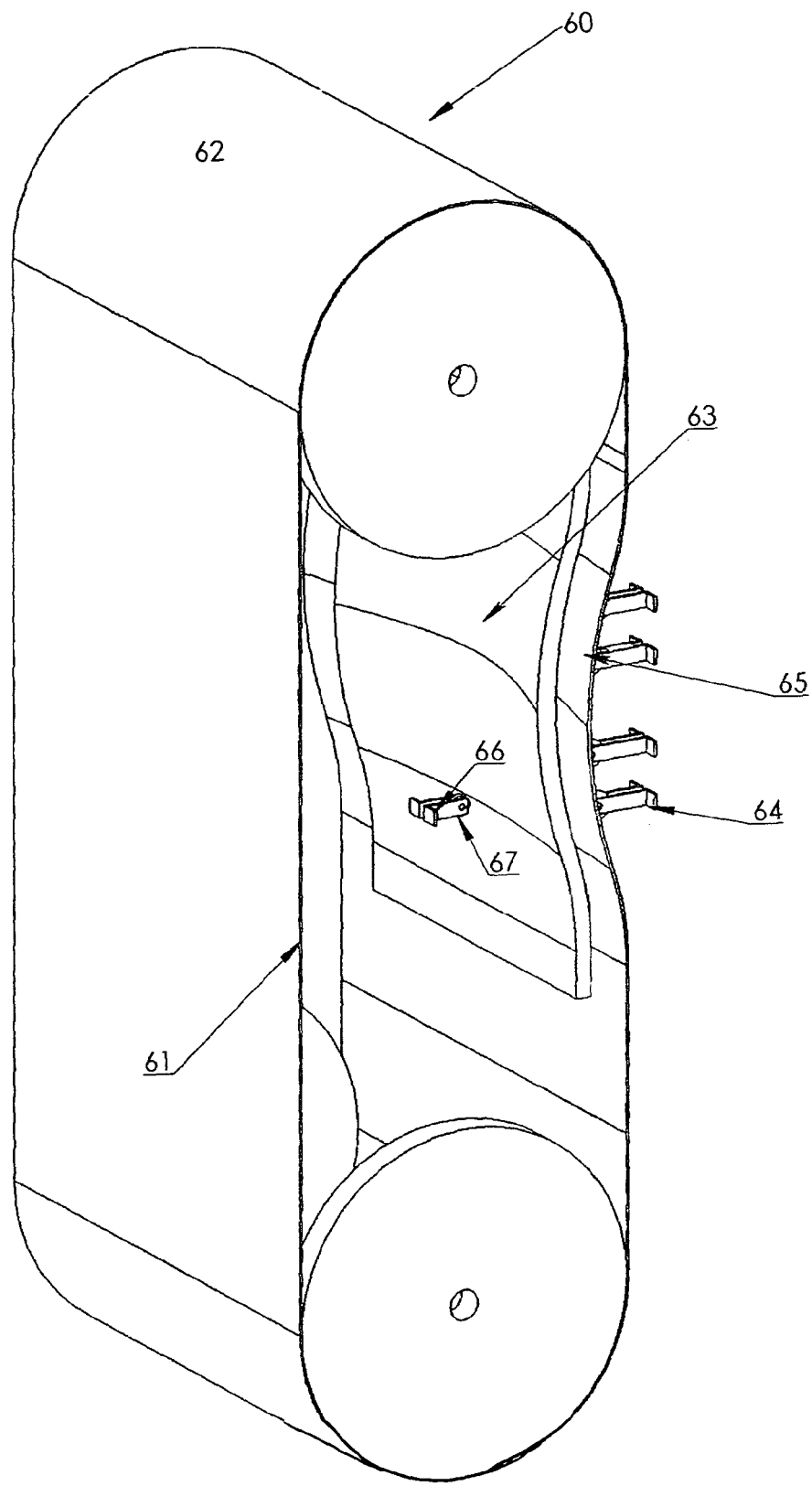
FIG. 8 is a schematic view of the CR reader of FIG. 7 in a reading mode.
Figure 9:
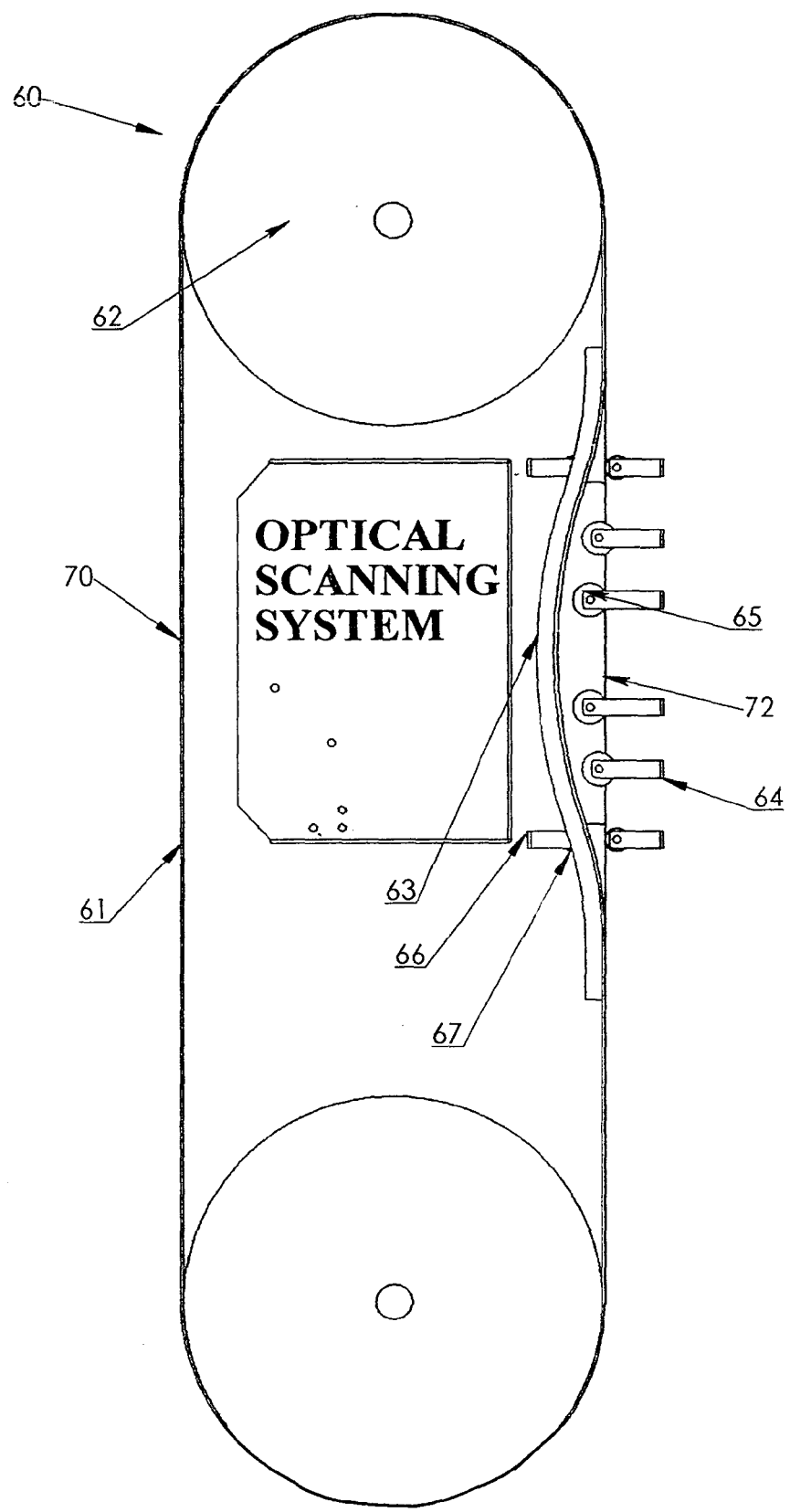
FIG. 9 is a schematic side sectional view of the CR reader of FIG. 8.
Figure 10:
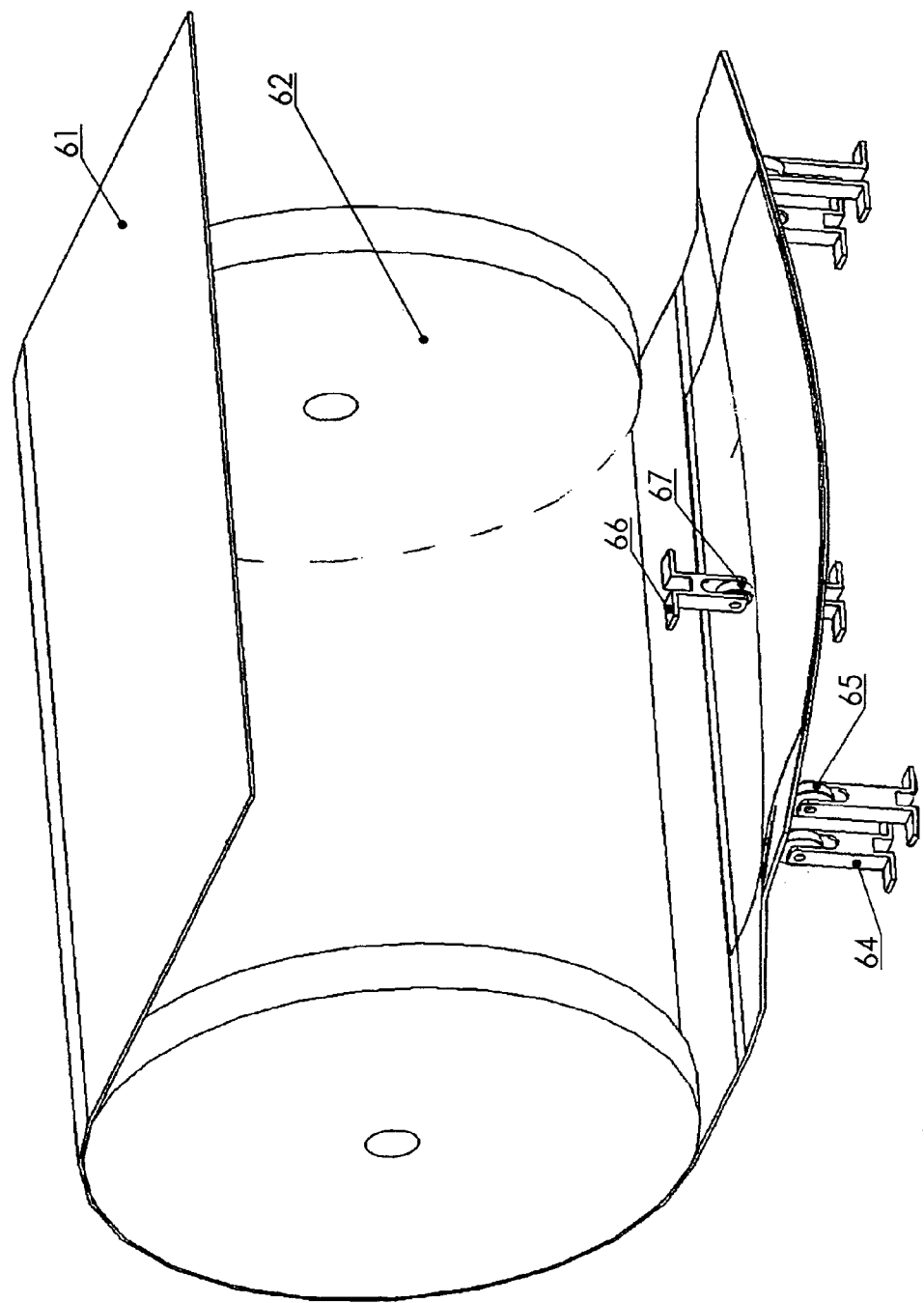
FIG. 10 is a sectional view of the CR reader of FIG. 8 in a fully shaped orientation.

As the exposed PSP 63 moves on and together with endless belt 61, it passes over one pulley 62 and moves to a reading station 72 (see FIGS. 8 and 9). Reading station 72 includes a plurality of rollers 65 mounted on raised bases 64 coupled to an inner surface of a housing (not shown) of the CR reader. At least one and preferably two or more rollers 67 are provided on raised bases 66 acting on the inner surface of the endless belt 61 and urging it in an outward direction, as seen most clearly in FIG. 10.

As the belt passes over the rollers 65 and 67, its path is changed to a curved path, following the contour of an imaginary arc defined by the rollers. The heights of the bases 64 and 66 are selected such that the endless belt (and the at least semi-flexible PSP on it) will be curved to the desired arc relative to the optical system 74 associated with the reading station, as described above, and as seen in FIGS. 8 and 10, respective schematic perspective and sectional views.

It will further be appreciated that the invention is not limited to what has been described hereinabove merely by way of example. Rather, the invention is limited solely by the claims which follow.

The invention claimed is:

1. Apparatus for supporting and shaping a photostimulable phosphor plate (PSP) during scanning in a CR reader, the apparatus comprising:
    elements for shaping at least part of a PSP to an arc which is a part cylinder, and which provides a substantially unitary radial distance from a beam deflecting device to a target point of scanning; and
    a cassette for a photo-stimulable plate (PSP) for use in a CR reader,
    wherein said shaping elements are disposed in said cassette.

2. The apparatus according to claim 1, further comprising a cassette for a photo-stimulable plate (PSP) for use in a CR reader, the cassette including a base adapted to receive a PSP, and wherein said shaping element includes a lifting mechanism disposed in the base, the lifting mechanism being arranged to permit the plate to lie flat on the base when outside the CR reader, and to lift the sides of the plate during scanning inside the CR reader.

3. The apparatus according to claim 2, and comprising two lifting mechanisms mounted along opposing sides of the base, each lifting mechanism including at least one lifting element pivotally mounted on a rod, the rod being actuated as the base is inserted into and ejected from the CR reader.

4. The apparatus according to claim 2, wherein said lifting mechanism is arranged to lift opposing sides of said PSP to a pre-selected shape when the PSP is inside a CR reader.

5. The apparatus according to claim 2, wherein said lifting mechanism is arranged to lift one side of the PSP to a pre-selected shape when the PSP is inside a CR reader.

6. The apparatus according to claim 1, wherein the shaping element includes a plurality of plates, each having a curved PSP-supporting surface, the plates being pivotally mounted in the cassette, such that when the cassette is outside of a CR reader, the plates lie parallel to the base of the cassette, and the PSP is held in the cassette in a flat orientation; and as the cassette is inserted into the CR reader, the plates pivot until they are perpendicular to the base of the cassette, and hold the PSP in a fully shaped orientation, approximating a part-cylinder, for scanning.

7. The apparatus according to claim 1, wherein said cassette is associated in the CR reader with a light guide for collecting UV light from a PSP in the cassette, the light guide including a curved surface of the same curvature as the PSP during scanning.

8. The apparatus according to claim 1, wherein two lifting mechanisms are mounted in the cassette beneath opposing sides of the base, each lifting mechanism including at least one lifting element pivotally mounted on a rod and arranged to engage the PSP, the rod being actuated as the base is inserted into and removed from a CR reader.

9. The cassette according to claim 8, wherein each lifting mechanism includes a plurality of lifting elements, each lifting element being mounted in registration with one of said slots and arrange to protrude through said slots when pivoted.

10. The cassette according to claim 1, wherein said lifting mechanism include a plurality of flaps, each having a curved PSP-supporting surface, the flaps being pivotally mounted in the cassette such that, in a folded orientation when the cassette is outside of a CR reader, said flaps lie parallel to the base of the cassette, and the PSP is held in the cassette in a flat orientation, and, as the cassette is inserted into a CR reader, said flaps pivot until they are perpendicular to the base of the cassette, and hold the PSP in a fully shaped orientation for scanning.

11. The apparatus according to claim 1, wherein said shaping elements are disposed in a scanning compartment of the CR reader.

12. The apparatus according to claim 1, wherein said shaping elements are disposed adjacent an endless belt on which the PSP can be mounted.

13. The apparatus according to claim 12, wherein the shaping element includes a plurality of raised guide elements mounted adjacent an endless belt on which the PSP is mounted.

14. The apparatus according to claim 1, the apparatus being associated in a CR reader with a light guide for collecting UV light from a shaped PSP, said light guide including a curved surface having the same shape as said PSP during scanning.

15. A method for supporting and shaping a photo-stimulable plate (PSP) in a CR reader during scanning, the method comprising:

associating with the PSP, at least during scanning, an element for shaping at least part of the PSP to an arc which is a part cylinder, and which provides a substantially unitary radial distance from a beam deflecting device to a target point of scanning;

mounting a PSP shaping element in a base of a cassette adapted to receive a PSP;

causing the shaping element to permit a plate to lie flat on the base when the cassette is outside a CR reader; and causing the shaping element to lift the sides of a PSP to approximately a part-cylindrical shape, as the cassette is inserted into the CR reader.

16. The method according to claim 15, comprising:
mounting a shaping element in a scanning compartment of the CR reader;
causing the shaping element to permit a PSP to lie flat in the compartment when the PSP is being scanned; and
causing the shaping element to lift the sides of the PSP to approximately a part-cylindrical shape, as the PSP is scanned in the CR reader.

17. The method according to claim 15, comprising:
mounting a plurality of shaping elements adjacent an endless belt moving through a reading zone in an integrated CR radiation image recorder and reader;
causing said shaping elements to shape a PSP to approximately a part-cylindrical shape, as the PSP is scanned in the CR reader.

* * * * *